Figure 1:
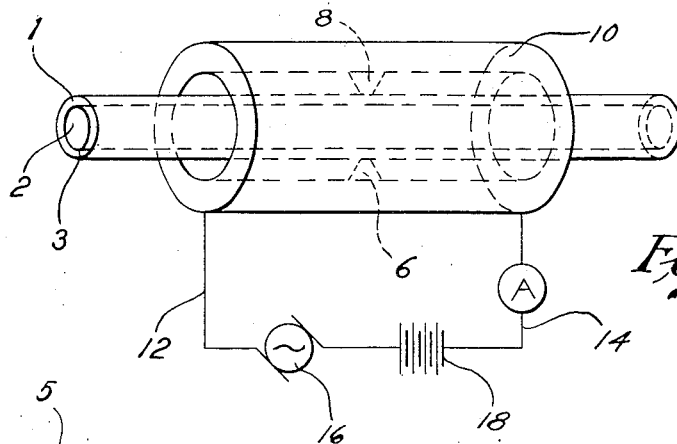

Oct. 11, 1932.  G. W. PIERCE  1,882,397

MAGNETOSTRICTIVE VIBRATOR

Filed Aug. 17, 1928   2 Sheets-Sheet 1

Inventor
George W. Pierce
By David Rines
Attorney

Oct. 11, 1932.    G. W. PIERCE    1,882,397
MAGNETOSTRICTIVE VIBRATOR
Filed Aug. 17, 1928    2 Sheets-Sheet 2

Inventor
George W. Pierce
By David Rives
Attorney

Patented Oct. 11, 1932

1,882,397

UNITED STATES PATENT OFFICE

GEORGE WASHINGTON PIERCE, OF CAMBRIDGE, MASSACHUSETTS

MAGNETOSTRICTIVE VIBRATOR

Application filed August 17, 1928. Serial No. 300,249.

The present invention relates to vibrators, and more particularly to magnetostrictive vibrators.

A magnetostrictive vibrator comprises a magnetostrictive core disposed in an electromagnetic field, such as may be established by passing an electric current through a field coil or winding. The core may be in the form of a rod or tube, or any other desired form. Any material having suitable properties may be used for the core, but the material should obviously be characterized by comparatively large magnetostrictive effects and comparatively low vibrational decrement.

When stimulated magnetically by the field, the core becomes very slightly mechanically deformed or distorted by magnetostriction. The resulting increment of deformation may be a lengthening, or a shortening, or some other distortion, depending on the material and on the polarity of the increment of the magnetic field. This action of the magnetic field upon the core will, for brevity, be hereinafter termed "stimulation". Conversely, when the vibrator is mechanically deformed or distorted, it will react magnetically upon the magnetic field by magnetostriction, with an increment of magnetization depending upon the nature of the preexisting magnetic field and the mechanical deformation, and this will produce its effect upon the electric current or voltage in the coil. This reaction will, for brevity, be hereinafter referred to as the "response". The mechanical deformation is produced by exciting reversible internal stresses in the core, and the core readily recovers upon the withdrawal of the deforming forces.

If the current or voltage is alternating, the electromagnetic field created thereby will also be alternating. The core will, therefore, increase and decrease in length, let us say, many times a second, every variation in the current producing its stimulative effect on the core, and every deformation of the core producing its reaction response upon the current. The core will, in consequence, freely vibrate mechanically by magnetostriction. Ordinarily, these vibrations will be quite small. When the alternating frequency is varied so as to assume a value close to, or substantially the same as, the natural frequency of mechanical vibration of the core, however, the amplitude of vibration of the core, though still small, becomes relatively quite large. The core will then react inductively on the load to render its consumption of power critical as to frequency for frequencies near the free frequency of the core. There will usually be more than one specific frequency of magnetization at which the core will thus resonate; for, in addition to one or more natural fundamental frequencies of mechanical vibration, it has also frequencies of vibration determined by the operation of the core in halves, thirds, fourths, fifths, etc.

The chief object of the present invention is to provide new and improved magnetostrictive vibrators.

Other objects will be explained hereinafter and will be particularly pointed out in the appended claims, it being understood that it is intended to set forth, by suitable expression in the claims, all the novelty that the invention may possess.

The invention will be explained in greater detail in connection with the accompanying drawings, in which Fig. 1 is a diagrammatic view of apparatus and circuits constructed and arranged to illustrate a principle of the present invention; Figs. 2 to 6, inclusive, are diagrammatic views of modifications; Fig. 7 is a plan view of the apparatus shown in Fig. 6; and Figs. 8, 9, 10 and 11 are views of further modifications.

To illustrate the principle of the invention, the magnetostrictive core is shown in Fig. 1 axially positioned within, and driven by, an inductive and resistive solenoid field coil 10, with clearance to permit free vibrations. The coil 10 is provided with conductors 12 and 14 by which it may be connected, for simplicity, in series with a source of alternating electromotive force, such as an alternating-current generator 16. A local battery 18 (shown in Fig. 1 in series with the source 16 and the winding 10) applies a steady magnetizing or polarizing field to the core, over which the alternating field produced by the generator 16 is superposed. The alternating field is preferably smaller than the steady field, in order that the combined fields may not, at any time, fall to zero. The battery may be dispensed with, and the core may be magnetized electromagnetically by a local source sending a polarizing current through a separate polarizing coil, or it may be permanently magnetized, instead, if the vibrator has sufficient magnetic retentiveness, or the polarization may be produced by a polarizing magnet supported near the vibrator, or the battery and a permanently magnetized core may be employed together. These remarks, it will be understood, are applicable to all the various types of composite vibrators illustrated and described herein.

In order not to complicate the showing of Fig. 1, no tuning condenser or other means is illustrated therein for tuning the circuit or varying the frequency of the alternating current flowing therein, particularly as the core may itself be a tuned element of very low decrement, thereby dispensing with or supplementing electrical tuning of the circuits. An important feature of the invention described in application Serial No. 158,452, filed January 3, 1927, of which the present application is a continuation in part, contemplates the use of a tuned system, as great frequency selectivity is thereby attained. The said application matured, on March 11, 1930, into Letters Patent No. 1,750,124.

The frequency of a particular mode of vibration of a rod or bar is determined by its elasticity, length and density. For some modes of vibration, the frequency is affected also by the width, thickness, radius, and the like, of the rod or bar. Different bodies, therefore, have different magnetostrictive properties. Alloys containing nickel chromium, cobalt and steel, in proper proportions, have comparatively large magnetostriction.

Thus, if the vibrator is in the form of a rod or tube, of small diameter, the period of vibration is nearly proportional to the length of the rod or tube. A rod of nickel-steel, for example, known in the trade as "stoic" metal, having a diameter of one-half centimeter and a length of ten centimeters, has a fundamental period of longitudinal vibration of about 1/21,000 of a second. A rod of the same diameter ten times as long (100 centimeters) has a period about 1/2100 of a second. Rods of the same diameter and the same two respective lengths, but constituted of an alloy of iron and chromium in a particular proportion, have the fundamental periods of 1/27,000 and 1/2700 of a second, respectively. These results are consistent with the fact that the two materials have different elasticities and densities.

As ordinary metals have their elasticity and density slightly modifiable by changes in temperature, furthermore, such temperature changes introduce small variations in the natural period of mechanical vibration of such bodies. As is explained in the said Letters Patent, substantially constant frequency, independent of the temperature, may be obtained by making the vibrator of material having a coefficient of the ratio of elasticity to density that varies as little as possible with variation of temperature. Certain alloys of steel, nickel and chromium are known to possess substantially constant coefficients of frequency with variations of temperature. One such alloy, constituted of 52% iron, 36% nickel and 12% chromium, is practically independent of temperature. I have found that a rod of nickel, chromium and steel has a period that is also practically independent of magnetic field strength over wide limits. A nickel-iron alloy of about 25% nickel, and another alloy of about 50% nickel have practically a zero temperature coefficient of frequency of vibration.

The elasticity and the density determine also the velocity of propagation of sound waves in the material. In general, the higher the velocity of the sound, the higher the frequency. As is well known, various metals and alloys have various velocities of sound.

Various alloys, furthermore, have different temperature coefficients of frequency of vibration. The values of some of these velocities and coefficients, which I have determined experimentally, are presented in my recently published paper on Magnetostriction oscillators, appearing in the Proceedings of the American Academy of Arts and Sciences, vol. 63, No. 1, April, 1928.

I have discovered a number of alloys that have positive coefficients (for which the frequency of vibration increases with increasing temperature) and a large number of other alloys that have negative coefficients (for which the frequency decreases with increasing temperature). One important group of alloys containing nickel and iron, with the percentage of nickel anywhere between 25% and 50%, has a positive coefficient, which varies in magnitude with the composition. A nickel-iron alloy of about 35% to 40% nickel has the largest positive coefficient.

I have found that either a reduced or an enhanced temperature coefficient of frequency vibration can be obtained by the employment of a composite vibrator made up of two or more materials united mechanically, as by welding or soldering. A substantially zero temperature coefficient is desired for many purposes. Composite vibrators of this nature may, indeed, be produced having frequency characteristics very different from that of one of the constituent materials alone. For example, a material of very low sound velocity, such as lead or type metal, may be united with some magnetostrictive alloy to obtain a low frequency of longitudinal vibration with a given length of vibrator.

As another example, a material of positive temperature coefficient of frequency may be united to a material of negative coefficient of frequency to give a vibrator of zero temperature coefficient of frequency. Again, a material which expands on increase of magnetization may be united with a material which contracts or which is neutral with increase of magnetization to produce a vibrator that operates transversely, so that when magnetized lengthwise the composite vibrator executes flexural vibrations. Such vibrations are of very low frequency compared with the frequency of longitudinal vibrations of the body.

The vibrator illustrated in Fig. 1 comprises a tubular body 1 of one material filled with a filler 2 of another material. At least one of these materials is magnetostrictive. The other may or may not be magnetostrictive, depending upon the use to which it is desired to put the vibrator. Thus, the filler 2 may be constituted of lead, type metal or various alloys, if low frequency is desired. A tight-fitting filler 2 of stoic metal or other metal having a positive temperature coefficient, in an outer tube 1 of material, like nickel, having a negative temperature coefficient, will yield a vibrator the frequency of the vibrations of which is practically independent of temperature.

Figure 9:
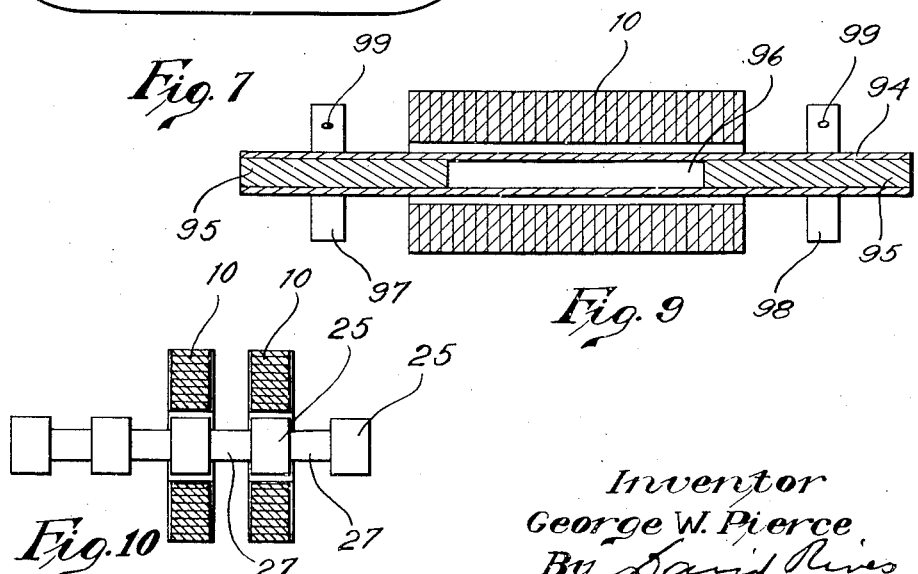
Figure 10:
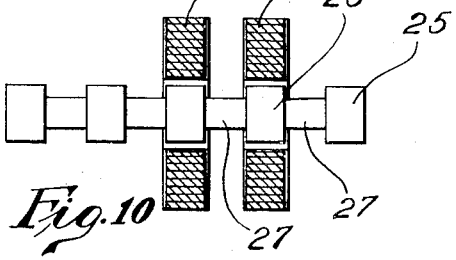

The two materials are united along their adjoining surface 3 in any desired way, as by welding, soldering, casting or pressing the body 2 inside of the tube 1. The filler 2 may extend throughout the whole length of the tube 1, or it may be in the form of plugs 95, inserted in each end of the tube 94, with a hollow space 96 left near the center of the tube 1, as shown in Fig. 9.

Figure 2:
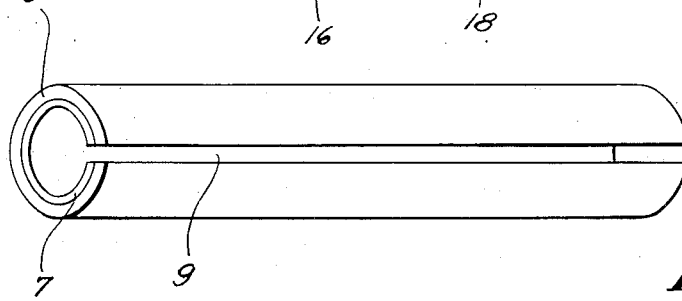

The two dissimilar materials 1 and 2 may be in the form of concentric tubular shells 5 and 7, united, along their adjoining surface, as shown in Fig. 2. The shells may form a closed cylindrical body or, as illustrated, they may be left with a lengthwise gap at 9, to reduce hysteresis and eddy currents. The result is a longitudinally slotted magnetostrictive tube.

Figure 3:
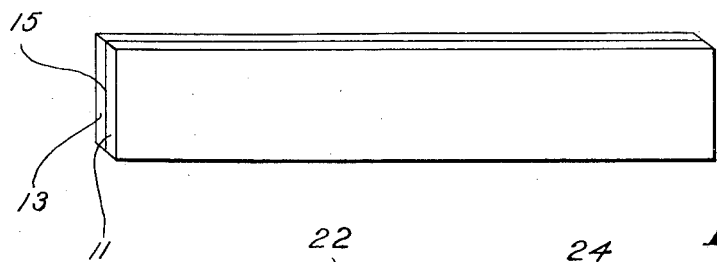

Or the vibrator may, as shown in Fig. 3, be constituted of two flat strips 11 and 13 of dissimilar materials, welded or otherwise joined together, in face-to-face contact, along their adjoining surfaces 15 to form a composite rectangular bar.

Figure 4:
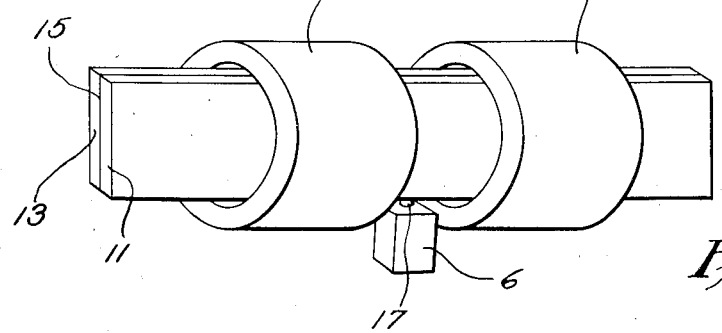
Figure 11:
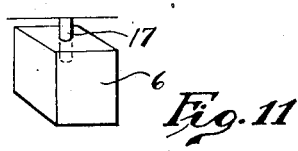

A bar vibrator of this character is shown in Fig. 4, provided with two symmetrically disposed coils 22 and 24, within which it is axially positioned. As described in the above-designated Letters Patent, the two coils may be connected in separate electric circuits, the vibrator then acting as a transformer to couple the circuits together for the transfer of resonant electric energy from one circuit to the other at the constant, critical frequency. The coils are shown positioned one on each side of the middle of the vibrator, but they may be compacted together near the center of the vibrator, or spread out, or otherwise disposed. The vibrator may be clamped in position by two clamps 6 and 8, as illustrated in Fig. 1, or it may be freely centrally supported upon a support 6 so as to vibrate longitudinally about a nodal point at its center. To this end, the vibrator may be supported upon the support 6 (Fig. 4) by a pin 17 that is soldered or welded or otherwise permanently secured to the support 6 at a central point, as shown. The pin 17 may, however, rest freely in a groove of the support 6, so as to render the vibrator easily removable. The vibrator may be otherwise supported also.

Figure 5:
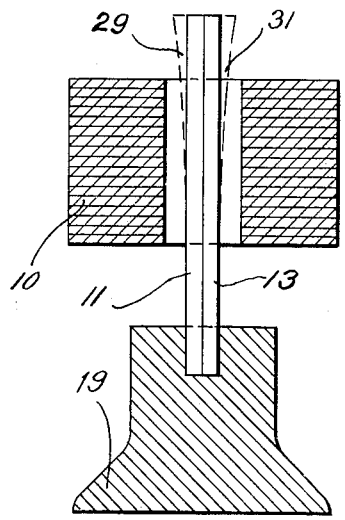
Figure 6:
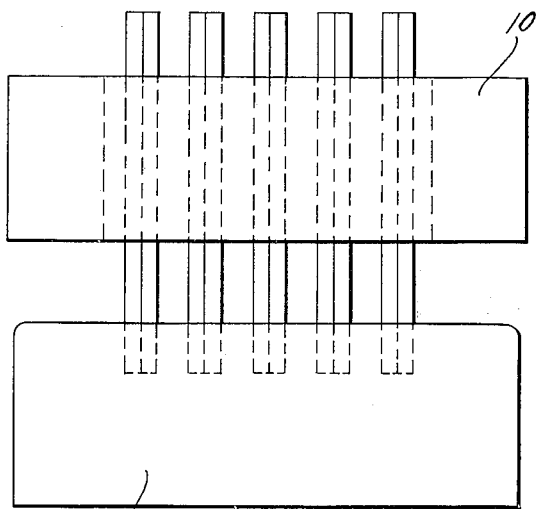
Figure 7:
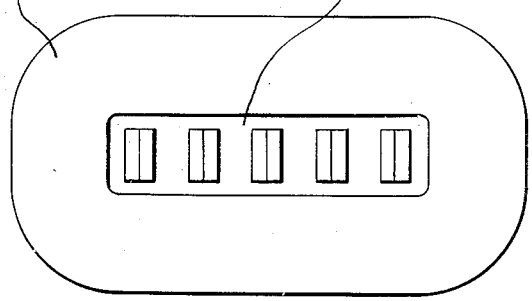

According to the modifications of Figs. 5 and 6, the composite vibrator is so designed as to yield transverse vibrations at low frequency, and serves as a very effective frequency meter. The composite bar shown in Fig. 5 is constituted of two materials 11 and 13, welded into a strip, as shown. It is supported rigidly at one end upon a base 19 and is surrounded by the driving coil 10. When an alternating current is made to traverse the coil 10, the top end of the bar oscillates or vibrates transversely between the limits 29 and 31, due to the unequal magnetostrictive operation of the two members 11 and 13 of the bar.

It is possible to employ a plurality of such composite bars or reeds, all secured to a common base 19, and having a single driving coil surrounding the group of reeds, as shown in Figs. 6 and 7. This device may serve as a frequency meter in that, when an alternating current traverses the coil, one particular reed, which is resonant to the frequency of the current, may be set into vibration while the others remain at rest. A calibration of these reeds as to frequency thus serves to determine the frequency of the current.

Figure 8:
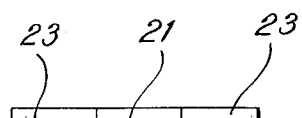

In Fig. 8, there is disclosed a composite bar consisting of a central length of one material 21, prolonged at each end by a length of another material 23, soldered or welded to the material 21.

The vibrators shown in Figs. 1, 2 and 8 may, like that of Fig. 3, be supplied with the windings 22 and 24, shown in Fig. 4, or they may be used with the mounting and circuit arrangements of any of the diagrams of my above-named Letters Patent, or application Serial No. 202,086, filed June 28, 1927.

A very efficient vibrator having a substantially zero temperature coefficient is illustrated in Fig. 9, comprising a nickel tube 94 within which is driven a nickel-steel body 95 having about 36% of nickel. The body 95 used extended throughout the length of the tube 94. The outside diameter of the nickel tube used was 0.97 cm. and the tube wall was 0.088 cm. thick. The temperature coefficient was 1/65000 per degree centigrade.

The body 95 may be replaced by lead, type metal or other alloys to reduce the frequency, and it may extend throughout the length of the tube 94, or, as shown at 96, the intermediate portion of the tube may be hollow. The vibrator may have weights 97 and 98 attached to the ends thereof, which may be adjustable, if desired. In Fig. 9, the weights 97 and 98 take the form of split collars, which may be clamped in adjusted position by screws or the like 99. These expedients effectively decrease the period of vibration to comparatively low adjustable values.

It will be understood that, in all cases, at least one of the materials of the composite vibrator is magnetostrictive, and the other material has a compensating property which causes a shifting of the characteristics of the vibrations toward the desired result.

Thus, as has been pointed out above, the compensation may consist in a modified frequency of the body. This is illustrated by the following example. The frequency of vibration of a thin nickel-tube vibrator about one meter long is 2500 cycles per second. A vibrator consisting of a nickel tube alone that would give 1000 cycles per second would have to be 2½ meters long, which is inconveniently large. All that is necessary, in order to obtain a vibration frequency of 1000 cycles per second with a convenient, one-meter tube, is to fill it.

As another illustration, a single bar of invar, mounted as shown in Fig. 5, when excited by the surrounding coil 10, would execute vibrations in the direction of the length of the bar, and if this bar were ten centimeters long, the frequency of vibration would be about 12,000 cycles per second. If, now, the single invar strip be replaced by a composite strip consisting of invar on one side and Monel metal, or brass, or almost any other material, on the other side, the lengthwise magnetization will make one of the component elements vibrate more or less than the other, or in an opposite sense to the other, and will give to the system a frequency of transverse vibration which may be relatively very small, for example, 60 cycles per second. I have built a series of composite reed vibrators of this character with periods ranging from 50 cycles per second to about 5,000 cycles per second, thus supplementing and extending the frequency spectrum of magnetostrictive vibrators.

A third compensatory action, which is highly useful in frequency-measuring or frequency-controlling devices, is the elimination of the effect of temperature on the frequency of vibration of magnetostrictive vibrators. This is attained, according to the present invention, as before explained, by combining a member having a positive temperature coefficient of frequency with a compensating member having a negative coefficient. The physical union of the two materials appears to have little, if any, effect upon their magnetostrictive properties. For the positive member, I prefer to use a nickel-steel alloy, such as has been referred to above, particularly a nickel-steel alloy of about the composition of invar. This is because of its availability and durability, and because it may be readily welded to the other material. Invar has the further advantage of being a strongly magnetostrictive body. I associate with the invar a compensatory body having a negative coefficient of frequency. For this I use preferably brass or some non-magnetic material, but I may also effectively use Monel metal or nickel, or almost any other material of suitable elastic qualities, provided it has a negative temperature coefficient of frequency. The relative thickness of the two bodies may be readily so chosen as to effect almost complete compensation for the effects of temperature on frequency of the composite system.

I have derived theoretically the following formula for the frequency $f$ of vibration of the longitudinally composite vibrator of the form of Figs. 1, 2 and 3:

$$f = \sqrt{\frac{f'^2 w' + f''^2 w''}{w' + w''}}, \quad (1)$$

where $w'$ and $w''$ are the respective weights of the two bodies, and $f'$ and $f''$ are the respective frequencies of the two bodies, it being understood that the two bodies are of the same length. This theoretical formula has proved to be quite accurate, in practice.

As a deduction from this equation, by a process of differentiation not here given, I have derived the approximate result that if $a'$ and $a''$ are the increases of frequency of two vibrators, respectively, for a given small change of temperature, then the condition for a zero temperature coefficient of the composite system is that $$a' w' f' = -a'' w'' f'' \quad (2)$$

so that, which the frequencies and temperature coefficients of frequency of the two materials are given, equation (2) permits a ready calculation of the weights of the two materials which associated together, will give a zero temperature coefficient of frequency.

As an example, I find that an invar strip increases in frequency 2.2 cycles in 10,000 per degree centigrade change in temperature; while a composite bar of invar with an equal longitudinal strip thickness of brass welded to it, as in Fig. 3, has this coefficient reduced to 0.44 cycles in 10,000 per degree centigrade. The brass has a negative coefficient which particularly compensates for the positive coefficient of invar. The particular thickness employed in this experiment was not sufficient to completely compensate, but by using a piece of brass about 1.3 times the thickness of the invar, the compensation may be made complete. In practice, where the calculations, on account of insufficient knowledge of the separate materials, do not give an exactly zero temperature coefficient of frequency, it is an easy matter, by trial and by filing away one of the materials, to adjust the system to any required accuracy.

It is readily understood from the above disclosures that a large variety of materials, when given proper relative dimensions, may be used to replace the brass, and to some extent also there is liberty of choice among a limited range of known materials with positive temperature coefficients to replace the invar and form a combination of negligible temperature coefficients of frequency. Because of this liberty of choice of materials it is preferred to describe the methods of temperature compensation in terms of the results obtained and the guiding formulæ (1) and (2), which indicate to those skilled in the art, the proper preliminary design of one form of the novel vibrator,—such design to be further modified by experimental tests and subsequent adjustment if necessary.

For a composite system of the form of Fig. 8, formulæ are not here given, but they can be readily derived and employed, or the proper characteristics may be obtained by experiment.

It will be understood that the invention is not restricted to the use of vibrators in the form of rods or tubes. Thus, the vibrator may be composed of a plurality of units, one or more of which may be constituted of small wires embedded as a unit in a highly elastic binding material, or attached together by solder or by welding in suitable spots, as at their centers or ends. A core of this character will reduce hysteresis and eddy currents, which would act in a detrimental manner at high frequencies.

It has before been explained that the use of heavy fillers will produce low-frequency vibrators. The beaded-rod vibrator shown in Fig. 10, on the other hand, is particularly adapted for the production of high frequencies, as described in the aforesaid paper in the Proceedings of the American Academy. This vibrator is constituted of a cylindrical rod having spaced-apart projections or beads 25, with the diameter of the beads about twice that of the less thick portions 27 of the rod. A separate coil 10 is provided for each of the two beads, or the beads may be disposed between adjacent coils.

To persons skilled in the art many other applications and modifications of the apparatus will occur, and no effort has here been made to be exhaustive.

What is claimed is:

1. A magnetostrictive vibrator having a substantially constant frequency with variations of temperature.
2. A magnetostrictive vibrator having a substantially constant frequency with variations of temperature, and constituted of an alloy having 25% nickel.
3. A magnetostrictive vibrator having a substantially constant frequency with variations of temperature, and constituted of an alloy having 50% nickel.
4. A magnetostrictive vibrator having a substantially constant frequency with variations of temperature, and constituted of an alloy having about 52% iron, 36% nickel and 12% chromium.
5. A composite magnetostrictive vibrator constituted of mechanically connected members of different magnetostrictive material.
6. A composite magnetostrictive vibrator constituted of mechanically connected members of different magnetostrictive material secured together end to end.
7. A composite magnetostrictive vibrator constituted of mechanically connected members of different magnetostrictive material secured along their length.
8. A frequency-determining device comprising a composite magnetostrictive vibrator constituted of mechanically connected members of different magnetostrictive material.
9. A composite magnetostrictive vibrator constituted of mechanically connected members of different magnetostrictive material, and means for subjecting the vibrator to the action of a varying magneto field.
10. A magnetostrictive vibrator comprising two bodies of different magnetostrictive properties combined together so as to have a substantially zero temperature coefficient of frequency.
11. A transformer having coils and a composite magnetostrictive vibrator disposed in the coils, the vibrator being constituted of mechanically connected members of different magnetostrictive material.
12. A composite magnetostrictive vibrator constituted of integrally united members of different magnetostrictive material.
13. A composite magnetostrictive vibrator constituted of mechanically connected members of different mechanical properties, one of the members being magnetostrictive.
14. A composite magnetostrictive vibrator constituted of mechanically connected members of different mechanical properties to compose a vibrator having a reduced temperature coefficient of frequency, one of the members being magnetostrictive.
15. A magnetostrictive vibrator constituted of magnetic alloy of two or more materials, the proportions of the materials being so chosen as to comprise a body having a substantially zero temperature coefficient of frequency.

16. A composite magnetostrictive vibrator constituted of mechanically united members one of which is magnetostrictive and the other of which is not magnetostrictive, the compensating properties of the said other member causing a shifting of the characteristics of the vibrations of the magnetostrictive member.

17. A composite magnetostrictive vibrator constituted of members mechanically connected together to each other, one of the members being magnetostrictive and the other being not magnetostrictive.

18. A composite magnetostrictive core in the form of a plurality of flat strips of different magnetostrictive material.

In testimony whereof, I have hereunto subscribed my name.

GEORGE W. PIERCE.